(12) United States Patent  
Higuchi

(10) Patent No.: US 11,481,506 B2
(45) Date of Patent: Oct. 25, 2022

(54) INFORMATION PROCESSING SYSTEM, INFORMATION PROCESSING APPARATUS, AND NON-TRANSITORY COMPUTER READABLE MEDIUM STORING PROGRAM

(71) Applicant: FUJIFILM Business Innovation Corp., Tokyo (JP)

(72) Inventor: Yasuyuki Higuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 509 days.

(21) Appl. No.: 16/208,569

(22) Filed: Dec. 4, 2018

(65) Prior Publication Data

US 2019/0213343 A1 Jul. 11, 2019

(30) Foreign Application Priority Data

Jan. 11, 2018 (JP) .............................. JP2018-002379

(51) Int. Cl.
*H04L 29/06* (2006.01)
*G06F 21/62* (2013.01)
(Continued)

(52) U.S. Cl.
CPC ........ *G06F 21/6209* (2013.01); *G06F 3/1222* (2013.01); *G06F 3/1239* (2013.01);
(Continued)

(58) Field of Classification Search
CPC ...... G06F 21/6209; G06F 21/31; G06F 21/34; G06F 2221/2141; G06F 3/1239;
(Continued)

(56) References Cited

U.S. PATENT DOCUMENTS 8,001,611 B2 * 8/2011 Nelson .................. H04L 63/205
726/28
9,019,536 B2 4/2015 Ohno
(Continued)

FOREIGN PATENT DOCUMENTS

JP 2013149103 8/2013
JP 2017102813 6/2017

OTHER PUBLICATIONS

S. Jeuk, J. Szefer and S. Zhou, "Towards Cloud, Service and Tenant Classification for Cloud Computing," 2014 14th IEEE/ACM International Symposium on Cluster, Cloud and Grid Computing, 2014, pp. 792-801, doi: 10.1109/CCGrid.2014.71. (Year: 2014).*
(Continued)

*Primary Examiner* — Shawnchoy Rahman
(74) *Attorney, Agent, or Firm* — JCIPRNET

(57) ABSTRACT

An information processing system includes a first management unit that manages assignment of authority to use a second service to a first user registered for a first service in the individual unit on a user side receiving provision of the first service, and a second management unit that manages a second user having authority to use the second service on a provider side providing the second service, in which the second management unit acquires information regarding the first user not assigned with the authority to use the second service, from the first management unit.

12 Claims, 16 Drawing Sheets

(51) Int. Cl.
    *G06F 21/34*     (2013.01)
    *G06F 3/12*     (2006.01)
    *G06F 21/31*     (2013.01)

(52) U.S. Cl.
    CPC ............ *G06F 3/1273* (2013.01); *G06F 21/31* (2013.01); *G06F 21/34* (2013.01); *G06F 2221/2141* (2013.01)

(58) Field of Classification Search
    CPC .... G06F 3/1203; G06F 3/1238; G06F 3/1222; G06F 3/1273
    See application file for complete search history.

(56) References Cited

U.S. PATENT DOCUMENTS

| | | | |
|---|---|---|---|
| 9,384,061 B1* | 7/2016 | Deivanayagam | G06F 9/5083 |
| 9,418,213 B1* | 8/2016 | Roth | G06F 21/335 |
| 2001/0009007 A1* | 7/2001 | Miyamae | G06F 21/31 |
| | | | 705/52 |
| 2006/0117010 A1* | 6/2006 | Hakala | G06F 21/6218 |
| | | | 707/999.009 |
| 2015/0029535 A1* | 1/2015 | Kondoh | G06F 3/1238 |
| | | | 358/1.14 |
| 2018/0144117 A1* | 5/2018 | Engler | G06F 21/44 |
| 2020/0210599 A1* | 7/2020 | Akers | H04L 51/02 |

OTHER PUBLICATIONS

Office Action of Japan Counterpart Application, with English translation thereof, dated Nov. 24, 2021, pp. 1-6.

\* cited by examiner

FIG. 16

TENANT USER EDITING

NAME USER C
MAIL ADDRESS UserC@fu...
GROUP
USAGE SERVICE [SHARING SERVICE]---421

SET/CANCEL PREFERENTIAL TENANT

▌PREFERENTIAL TENANT [NOT SET ▼]

[BACK] [UPDATE]

FIG. 17

TENANT USER EDITING

NAME USER C
MAIL ADDRESS UserC@fu...
GROUP
USAGE SERVICE

SET/CANCEL PREFERENTIAL TENANT

▌PREFERENTIAL TENANT [NOT SET ▼]

[BACK] [UPDATE]

INFORMATION PROCESSING SYSTEM, INFORMATION PROCESSING APPARATUS, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-002379 filed Jan. 11, 2018.

BACKGROUND

(i) Technical Field

The present invention relates to an information processing system, an information processing apparatus, and a non-transitory computer readable medium storing a program.

(ii) Related Art

A company-oriented service is provided in the unit of, for example, a tenant ID allocated to each organization.

SUMMARY

Registration of users of a service for which usage authority is necessary is managed by both of a service provider side and a tenant side.

Aspects of non-limiting embodiments of the present disclosure relate to an information processing system, an information processing apparatus, and a non-transitory computer readable medium storing a program, capable of assigning authority to use a second service to some users receiving provision of a first service from a provider side providing the second service in a case where the authority to use the second service is not set for the users.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including a first management unit that manages assignment of authority to use a second service to a first user registered for a first service in the individual unit on a user side receiving provision of the first service; and a second management unit that manages a second user having authority to use the second service on a provider side providing the second service, in which the second management unit acquires information regarding the first user not assigned with the authority to use the second service, from the first management unit.

BRIEF DESCRIPTION OF THE DRAWINGS

Exemplary embodiment(s) of the present invention will be described in detail based on the following figures, wherein:

FIG. 16 is a diagram illustrating an example of a tenant user editing screen displayed in a case where authority to use an electronic document sharing service is assigned; and FIG. 17 is a diagram illustrating an example of the tenant user editing screen displayed in a case where authority to use the electronic document sharing service is not assigned.

DETAILED DESCRIPTION

Hereinafter, with reference to the diagrams, exemplary embodiments of the invention will be described.

Exemplary Embodiment 1

Figure 1:
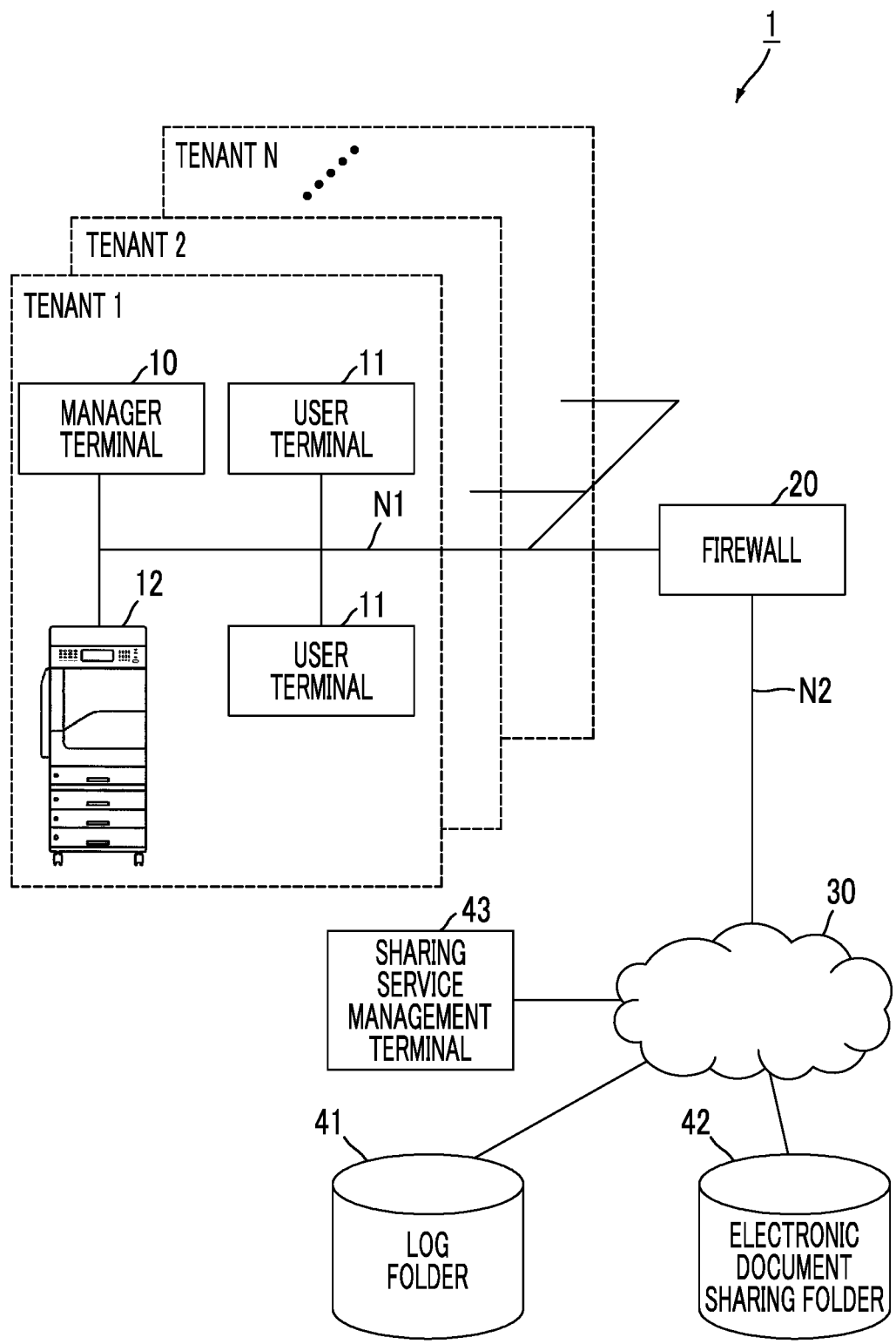
FIG. 1 is a diagram for explaining a summary of an information processing system supposed in the present exemplary embodiment.

FIG. 1 is a diagram for explaining a summary of an information processing system 1 supposed in the present exemplary embodiment.

The information processing system 1 has tenants 1 to N in a company which is a service providing destination.

In the present exemplary embodiment, a service corresponding to the tenants 1 to N will be referred to as a tenant type service. In the tenant type service, service provision is managed in the unit of a tenant. The tenant is set, for example, in the unit of a division in a company.

A plurality of users and a single manager are registered in each tenant. Hereinafter, a user registered in a tenant will be referred to as a tenant user. A tenant user here is an example of a first user.

A manager is a single tenant user. A manager may not concurrently serve as managers of a plurality of tenants. Therefore, N managers who do not overlap each other are respectively set in N tenants.

In the present exemplary embodiment, the tenants 1 to N are differentiated from each other by, for example, identifiers (IDs) for specifying managers.

In FIG. 1, a terminal used by a tenant user registered as a manager is represented by a manager terminal 10, and terminals used by tenant users other than the manager are represented by user terminals 11. The manager terminal 10 is not required to be a terminal specific to the manager, and may be a shared terminal which is available to unspecified workers. In a case of a shared terminal, the shared terminal is determined to be used as the manager terminal 10 or the user terminal 11 depending on whether or not a tenant user who logs in has authority of a manager.

In FIG. 1, a service target terminal is represented by an image forming apparatus 12.

These terminals are connected to each other via an internal network N.

The manager terminal 10 and the user terminals 11 are so-called computers.

The image forming apparatus 12 is an apparatus having a copying function, a scanner function, a printing function, a FAX function, a communication function, and the like. However, the image forming apparatus 12 may be an apparatus specialized for some of the copying function, the scanner function, the printing function, the FAX function, and the communication function. A so-called electronic blackboard, a projector, and a display apparatus are also included in the image forming apparatus 12 as long as the apparatuses have a function related to image formation. An apparatus having a function of forming a stereoscopic image is also included as an aspect of the image forming apparatus 12.

In the present exemplary embodiment, a log service is supposed as an example of the tenant type service. In the log service, for example, a history regarding usage of the image forming apparatus 12 or a history regarding failures is accumulated as log information in a data storage on a cloud 30. A tenant user may be given advice on provision of or an inquiry about the log information.

The tenant type service also includes a name card management service in which information regarding a name card read by the image forming apparatus 12 is accumulated in the data storage on the cloud 30, and the accumulated information regarding name cards is provided to a tenant user.

The tenant type service is available to any tenant user. The tenant type service is an example of a first service.

In FIG. 1, a region in which the log information is accumulated in the data storage is represented by a log folder 41.

Registration of a tenant user may be performed by only a manager on a tenant side. In other words, a manager on a provider side providing the tenant type service is not involved in registration of a tenant user.

A provider side providing the tenant type service manages each tenant by using an identifier and a password for specifying a manager set in each tenant.

Therefore, the tenant type service provider side provides a corresponding service (for example, a log service) in a case where a tenant user presents an identifier and a password for specifying a manager.

In FIG. 1, a firewall 20 is provided at a contact point between an internal network N1 in each of the tenants 1 to N and an external network N2.

The firewall 20 detects and blocks illegal access to the internal network N1 from the external network N2.

The cloud 30 is connected to the above-described log folder 41, an electronic document sharing folder 42, and a sharing service management terminal 43 operated by a manager on a provider side of an electronic document sharing service (hereinafter, also referred to as a "sharing service"). The sharing service management terminal 43 is not required to be a terminal specific to the manager, and may be a shared terminal which is available to unspecified workers. In a case of a shared terminal, the shared terminal is determined to be used as the sharing service management terminal 43 or other terminals depending on whether or not a worker who logs in has authority of a manager.

A terminal operated by the manager on the tenant type service provider side is also connected to the cloud 30. Needless to say, the terminal here is not required to be a terminal specific to the manager, and may be a shared terminal which is available to unspecified workers.

The log folder 41 and the electronic document sharing folder 42 are realized by a partial region of the data storage connected to the cloud 30. The sharing service management terminal 43 is a so-called computer.

Here, the electronic document indicates an electronized document, and includes, for example, a document created by office software, a document incorporated with the scanner function, a document transmitted and received with the FAX function, and a Portable Document Format (PDF) document.

The electronic document sharing folder 42 is a region on the data storage which is permitted to be accessed by a specific user having usage authority in order to share an electronic document. In the present exemplary embodiment, a service provided via the electronic document sharing folder 42 is referred to as an electronic document sharing service.

In the electronic document sharing service, provision of a service is managed in the unit of each user unlike the tenant type service.

As mentioned above, the electronic document sharing service is a service separate from the tenant type service.

Therefore, authority to use the electronic document sharing service may be individually assigned to a tenant user. The authority is assigned in the individual unit, and thus it may not be said that all tenant users have the authority to use the electronic document sharing service. In other words, the authority to use the electronic document sharing service may be assigned to only some of the tenant users.

Registration of the authority to use the electronic document sharing service is individually performed on a service provider side and a service user side receiving provision of the service.

The usage authority is registered by using the sharing service management terminal 43 on the service provider side. The usage authority is registered by using the manager terminal 10 on the service user side.

In the present exemplary embodiment, a sharing service for which registration of usage authority is necessary for each individual is provided as a cloud service. The sharing service is an example of a second service.

The manager terminal 10 is an example of a first management unit, and the sharing service management terminal 43 is an example of a second management unit.

Hardware Configuration

Figure 2:
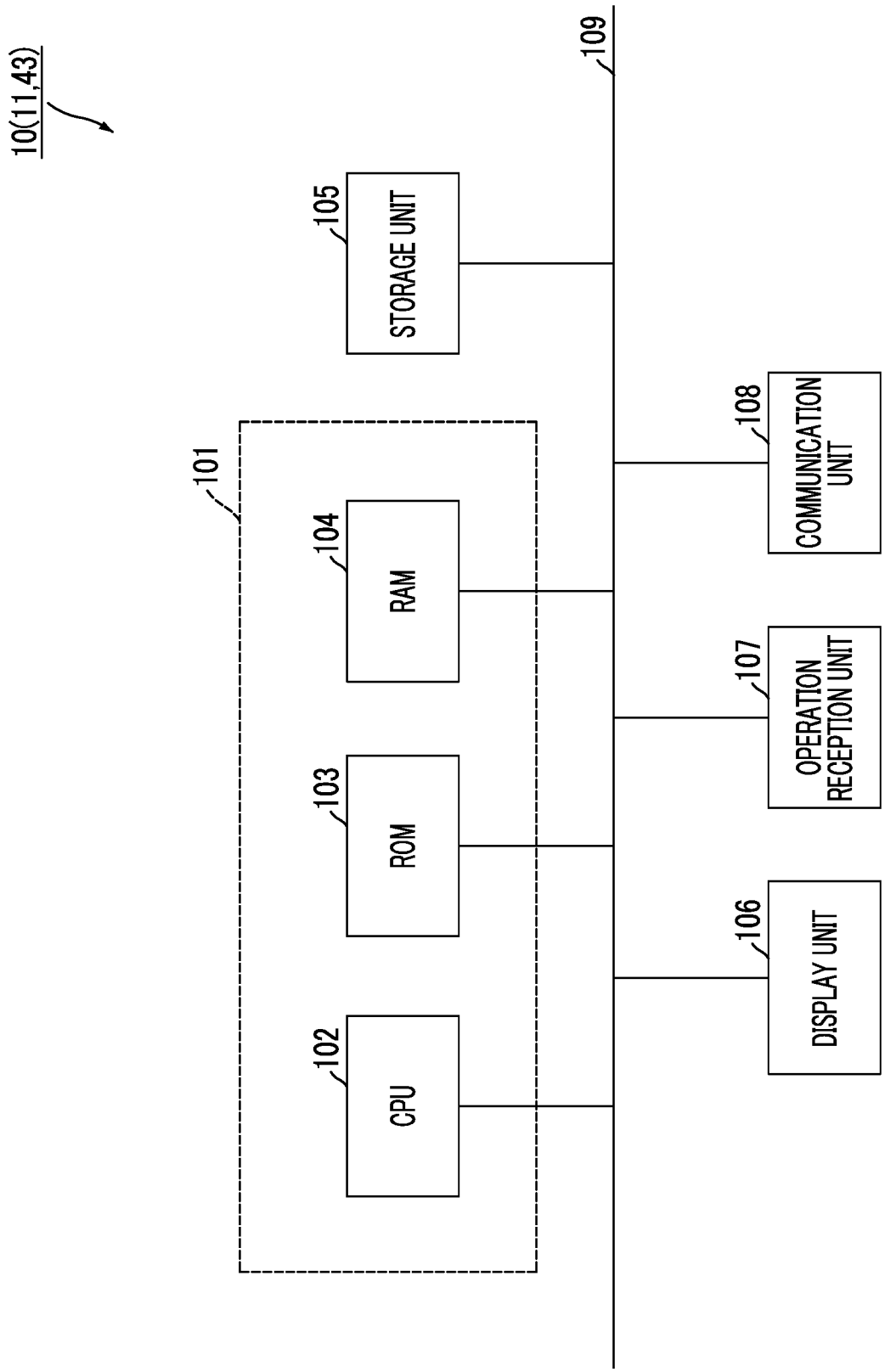
FIG. 2 is a diagram for explaining a hardware configuration example of a computer according to the exemplary embodiment.

FIG. 2 is a diagram for explaining a hardware configuration example of a computer according to the exemplary embodiment.

The computer here corresponds to the manager terminal 10 disposed on the tenant side, the user terminals 11 disposed on the tenant sides, and the sharing service management terminal 43 disposed on the service provider side.

Hereinafter, the manager terminal 10 will be described as a representative.

The manager terminal 10 includes a control unit 101 which controls the entire apparatus, a storage unit 105 which is used to store data or the like, a display unit 106 which is used to display an operation reception screen or an image, an operation reception unit 107 which receives a user's input operation, and a communication unit 108 which is used for communication with external apparatuses.

The respective units are connected to each other via a bus 109, and transmits and receives data via the bus 109.

The control unit 101 is an example of a controller, and is configured with a central processing unit (CPU) 102, a read only memory (ROM) 103, and a random access memory (RAM) 104.

The ROM 103 stores a fundamental program (operating system) executed by the CPU 102 or various settings. The CPU 102 uses the RAM 104 as a work area, and executes an application program read from the ROM 103 or the storage unit 105.

The respective units of the manager terminal 10 are controlled by executing the program.

The storage unit 105 is configured with a storage device such as a hard disk device or a semiconductor memory.

The display unit 106 is a display device which displays various images generated as a result of execution of the operating system. The display unit 106 is configured with, for example, a liquid crystal display panel or an organic electroluminescence (EL) display panel.

The operation reception unit 107 is an input device which receives an operation from a user, and is configured with, for example, a button, a switch, and a touch panel.

The communication unit 108 is configured with, for example, a LAN interface.

Figure 3:
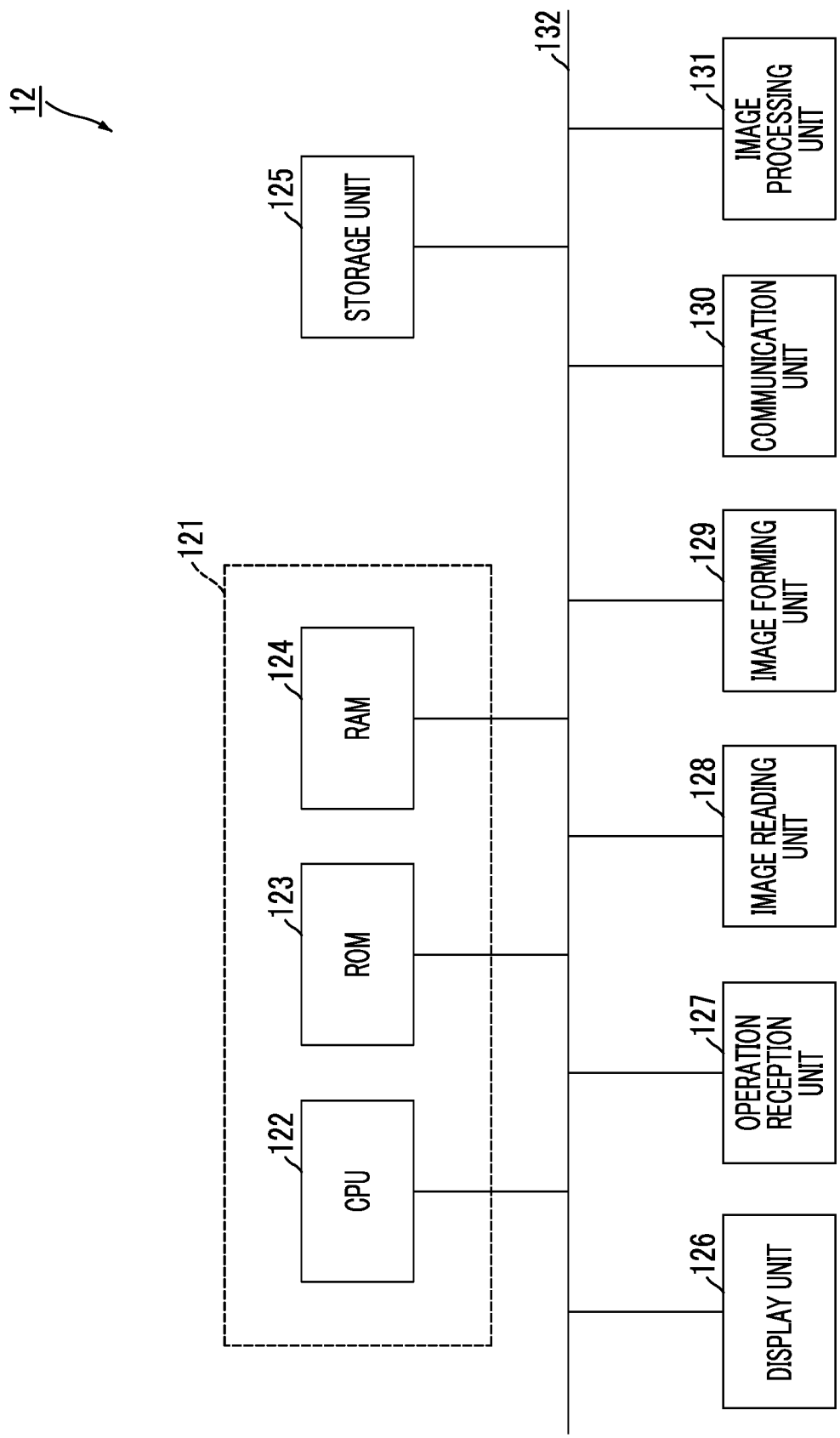
FIG. 3 is a diagram for explaining a hardware configuration example of an image forming apparatus according to the exemplary embodiment.

FIG. 3 is a diagram for explaining a hardware configuration example of the image forming apparatus 12 according to the exemplary embodiment.

The image forming apparatus 12 includes a control unit 121 which controls the entire apparatus, a storage unit 125 which is used to store image data or the like, a display unit 126 which is used to display an operation reception screen or an image, an operation reception unit 127 which receives a user's input operation, an image reading unit 128 which reads an image of a set original document so as to generate image data, an image forming unit 129 which forms an image on paper which is an example of a recording material according to, for example, an electrophotographic method or an ink jet method, a communication unit 130 which is used for communication with an external apparatus (for example, the log folder 41 (refer to FIG. 1) or the electronic document sharing folder 42 (refer to FIG. 1)), and an image processing unit 131 which performs image processing such as color correction or grayscale correction on an image indicated by image data.

The respective units are connected to each other via a bus 132, and transmits and receives data via the bus 132.

The control unit 121 is an example of a controller, and is configured with a CPU 122, a ROM 123, and a RAM 124.

The ROM 123 stores firmware executed by the CPU 122 or various settings. The CPU 122 uses the RAM 124 as a work area, and executes the firmware read from the ROM 123 or an application program read from the storage unit 125.

The respective units of the image forming apparatus 12 are controlled by executing the program. For example, forming of an image on a paper surface or generation of a read image is controlled.

The storage unit 125 is configured with a storage device such as a hard disk device or a semiconductor memory.

The display unit 126 is a display device which displays various images generated as a result of execution of the firmware. The display unit 126 is configured with, for example, a liquid crystal display panel or an organic EL display panel.

The operation reception unit 127 is an input device which receives an operation from a user, and is configured with, for example, a button, a switch, and a touch panel.

The image reading unit 128 is a so-called scanner device. The image forming unit 129 is, for example, a printing engine forming an image on paper which is an example of a recording material.

The communication unit 130 is configured with, for example, a LAN interface.

The image processing unit 131 is configured with, for example, a dedicated processor which performs image processing such as color correction or grayscale correction on image data.

Functional Configuration of Sharing Service Management Terminal

Figure 4:
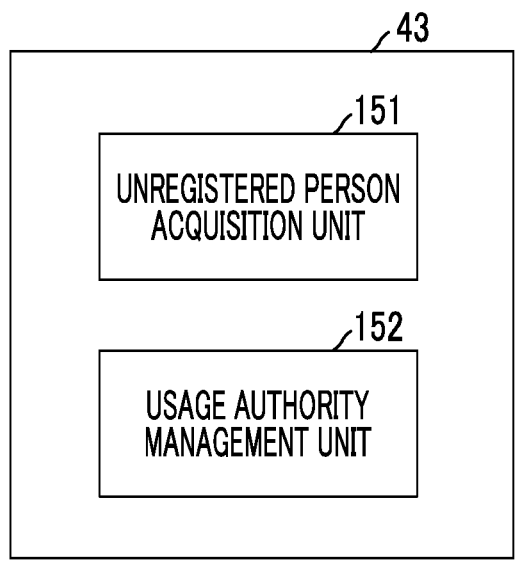
FIG. 4 is a diagram for explaining a functional configuration example of a sharing service management terminal according to the exemplary embodiment.

FIG. 4 is a diagram for explaining a functional configuration example of the sharing service management terminal 43 according to the exemplary embodiment.

As described above, the sharing service management terminal 43 is configured with a computer, and manages provision of the electronic document sharing service by the CPU 102 (refer to FIG. 2) executing the program.

The sharing service management terminal 43 includes an unregistered person acquisition unit 151 which acquires information regarding a tenant user not assigned with authority to use the sharing service from a tenant side and a usage authority management unit 152 which manages the authority to use the sharing service as parts of functions regarding management of the sharing service.

The unregistered person acquisition unit 151 here is an example of an acquisition unit, and the usage authority management unit 152 is an example of a management unit. The sharing service management terminal 43 is an example of an information processing apparatus.

Process of Assigning Usage Authority from Sharing Service Provider Side

As described above, the manager of the sharing service provider side is not involved in registration of a tenant user.

Thus, in order to provide the sharing service to a tenant user, it is necessary for the manager on the tenant side to perform work of registering the tenant user and for the manager on the sharing service provider side receiving a notification from the manager on the tenant side to perform work of registering the tenant user.

Figure 5:
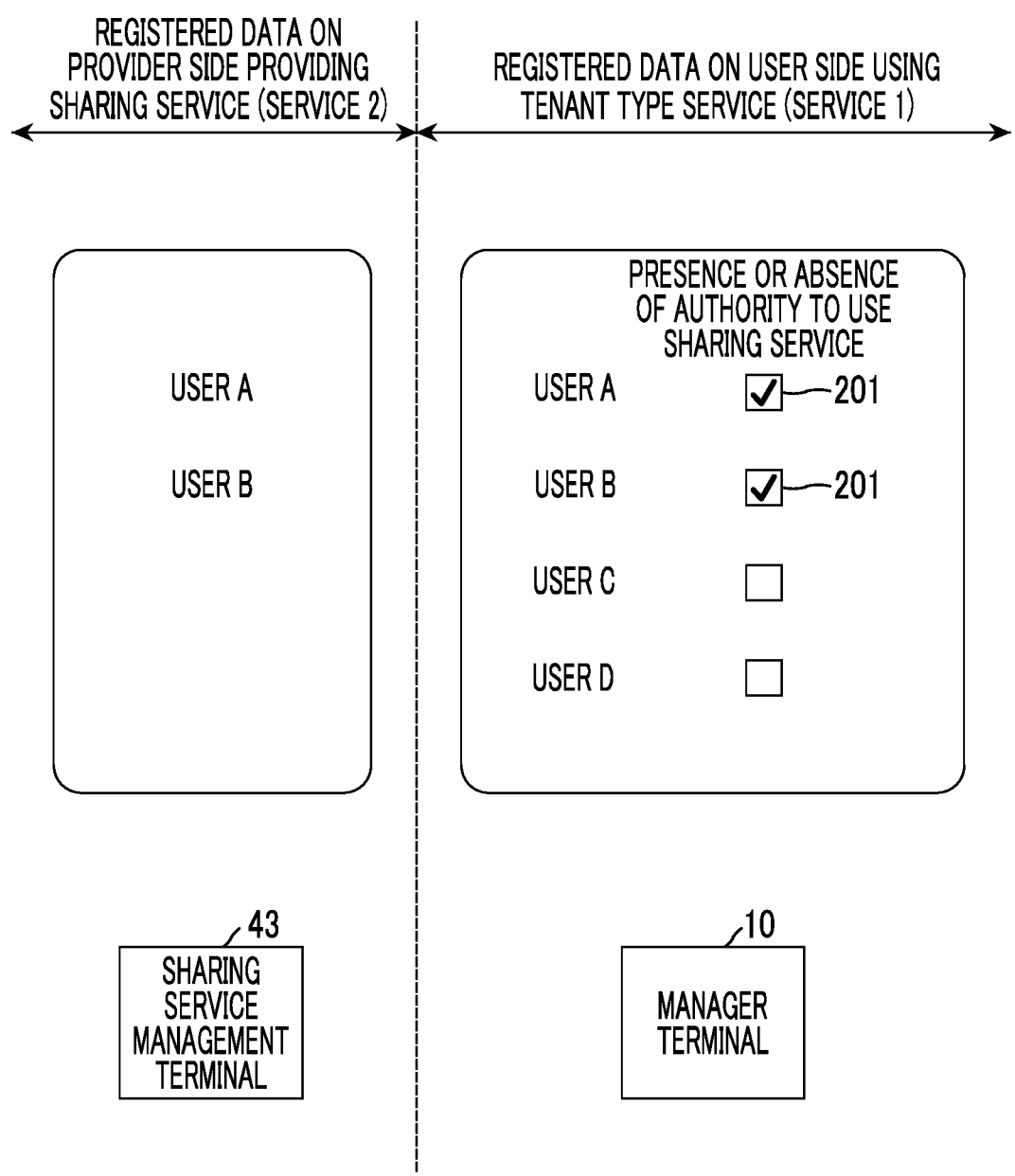
FIG. 5 is a diagram conceptually illustrating a difference between registered data on a sharing service provider side and registered data on a user side using a tenant type service.

FIG. 5 is a diagram conceptually illustrating a difference between registered data on the sharing service provider side and registered data on the user side using the tenant type service.

FIG. 5 illustrates a case where there are four tenant users such as a user A, a user B, a user C, and a user D, and two persons such as the user A and the user B are assigned with authority to use the sharing service. A check flag 201 in FIG. 5 indicates that the authority is assigned.

The user A, the user B, the user C, and the user D are examples of first users.

On the other hand, in FIG. 5, two persons such as the user A and the user B are illustrated as registered data on the sharing service provider side. The user A and the user B here are examples of second users.

In FIG. 5, registration on the sharing service provider side is performed in the individual unit, and is not associated with a tenant. However, an individual registered in the sharing service may be associated with a tenant.

Figure 6:
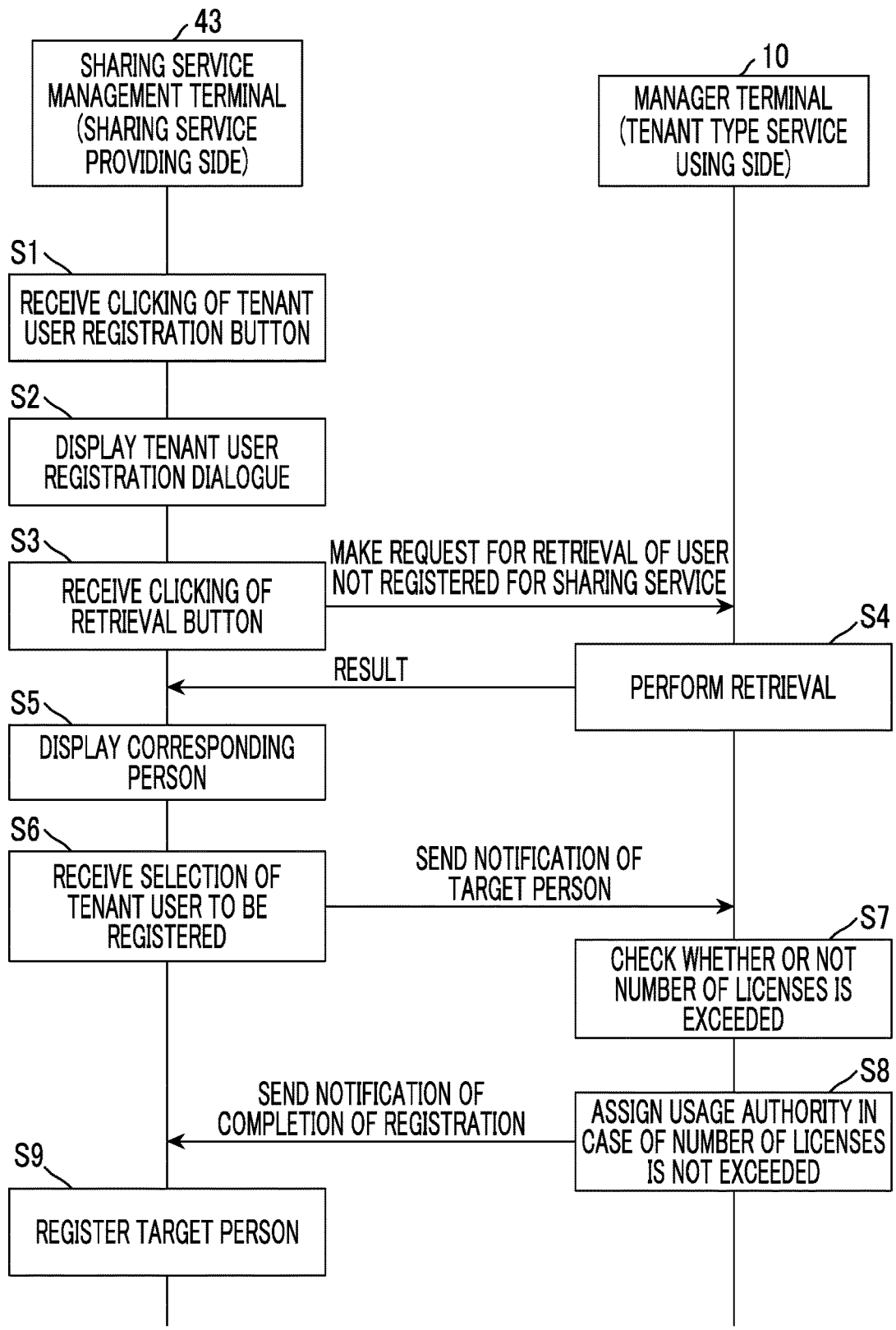
FIG. 6 is a diagram illustrating an example of a sequence for explaining a state in which a tenant user not assigned with authority to use a sharing service is assigned with the authority through work performed by a manager on the sharing service provider side.

FIG. 6 is a diagram illustrating an example of a sequence for explaining a state in which a tenant user not assigned with authority to use the sharing service is assigned with the authority through work performed by the manager on the sharing service provider side.

First, a description will be made of an example of a screen operated by the manager on the sharing service provider side.

Figure 7:
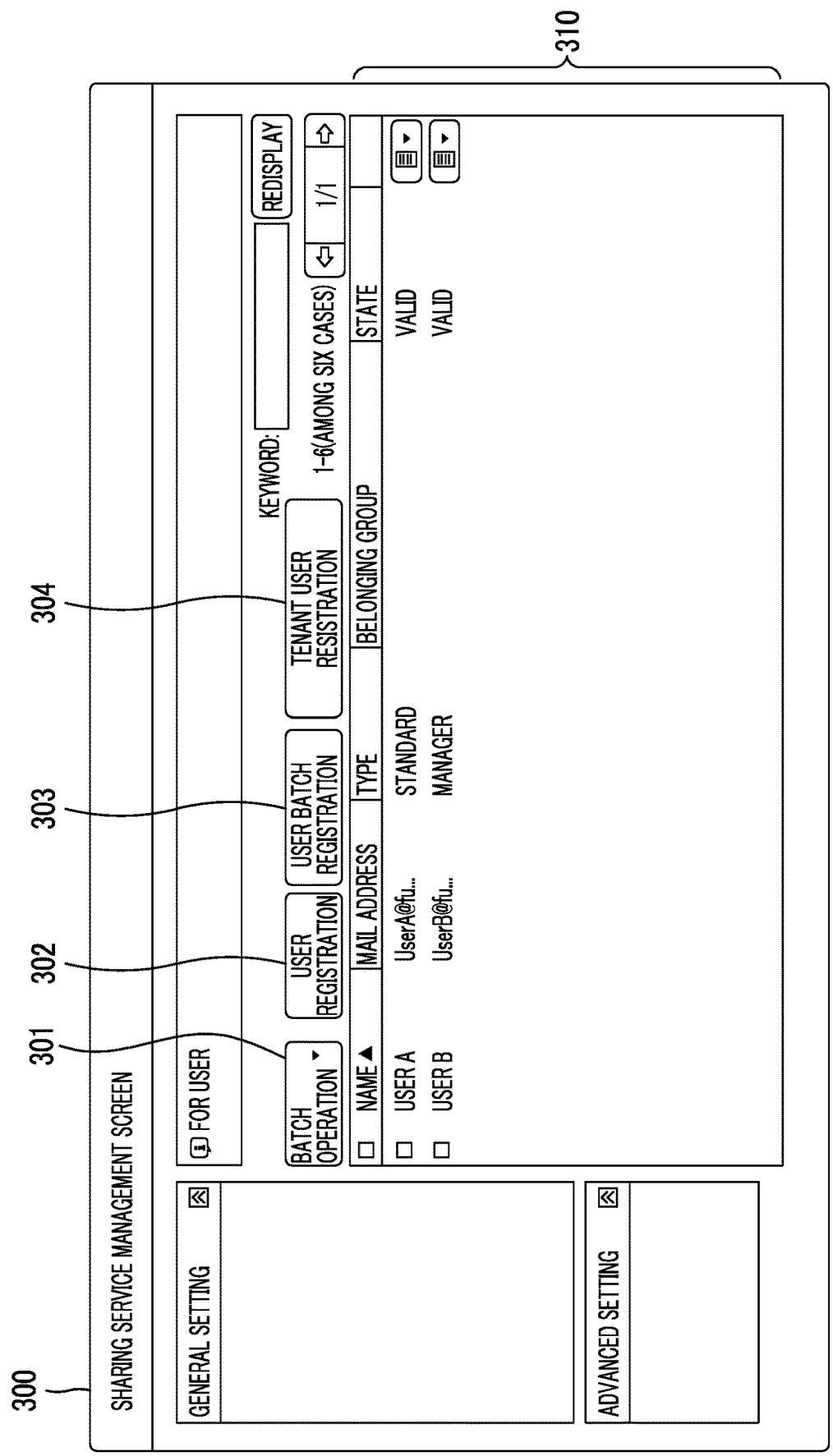
FIG. 7 is a diagram illustrating an example of a sharing service management screen displayed on the sharing service management terminal.

FIG. 7 is a diagram illustrating an example of a sharing service management screen 300 displayed on the sharing service management terminal 43.

The sharing service management screen 300 includes a batch operation button 301 for allocating a work box, a user registration button 302 used to individually register a specific user selected in an operation screen 310, a user batch registration button 303 used to register a plurality of users selected in the operation screen 310 at one time, a tenant user registration button 304 used to register a tenant user of which authority to use the sharing service is not registered.

As registered users, the user A and the user B are displayed on the operation screen 310 in FIG. 7. The user B is a manager of the tenant.

In a case where the sharing service management screen 300 is a screen corresponding to a specific tenant, and the tenant user registration button 304 is operated on the screen, a process based on the specific tenant is performed.

On the other hand, in a case where the sharing service management screen 300 is a screen on which a list of users of the sharing service is displayed, and the tenant user registration button 304 is operated on the screen, a screen for designating the processing target tenant is displayed. An operation after the tenant is designated is the same as in a case where the sharing service management screen 300 corresponds to a specific tenant.

FIG. 6 will be continuously described.

In the present exemplary embodiment, a description will be made of a case where the manager on the sharing service provider side clicks the tenant user registration button 304 (refer to FIG. 7) through the sharing service management terminal 43.

In this case, the sharing service management terminal 43 receives the clicking of the tenant user registration button 304 (step S1), and displays a tenant user registration dialogue (step S2).

Figure 8:
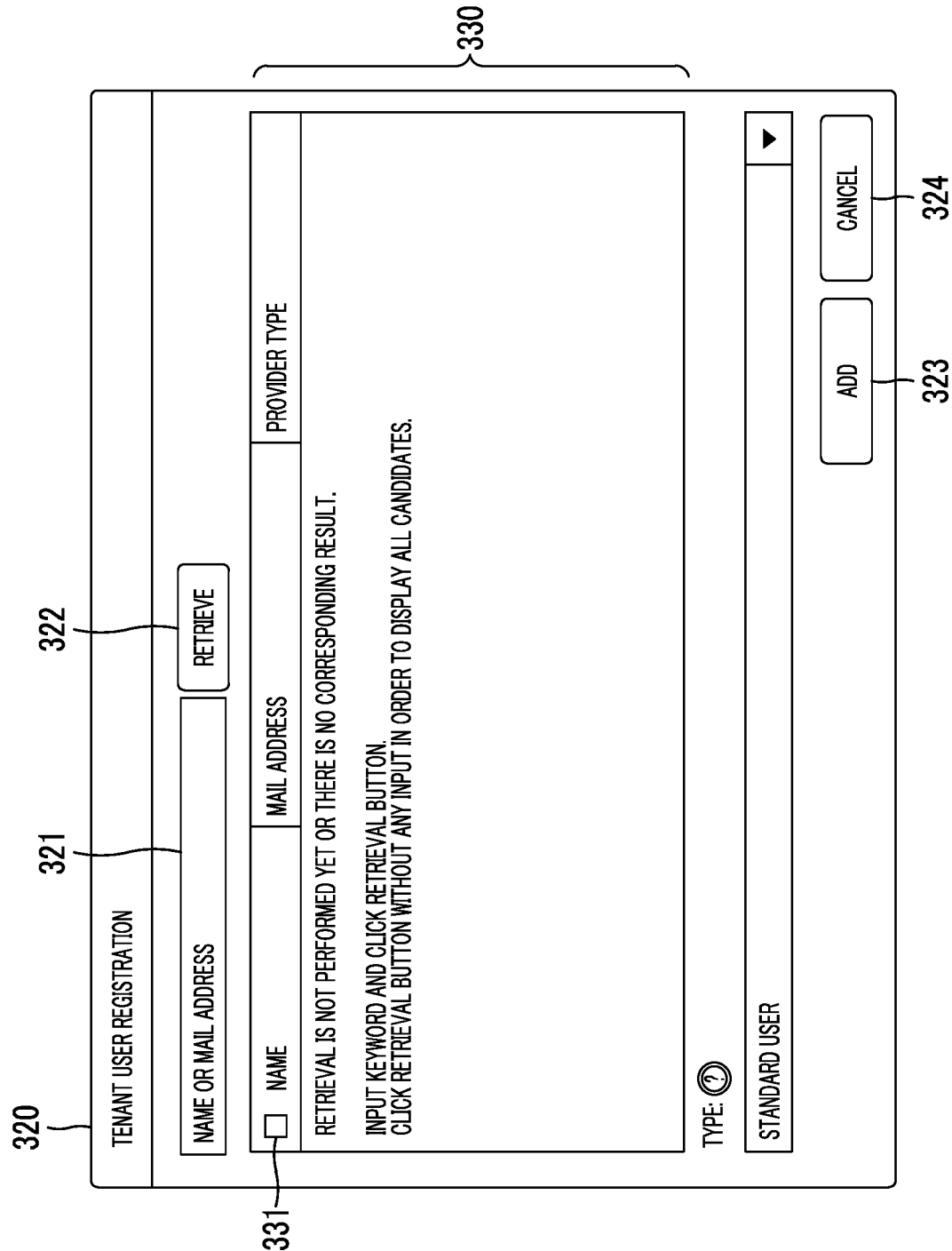
FIG. 8 is a diagram for explaining a display example of a tenant user registration dialogue.

FIG. 8 is a diagram for explaining a display example of a tenant user registration dialogue 320.

The tenant user registration dialogue 320 is provided with an input field 321 for a character string (keyword), a retrieval button 322 for giving an instruction for execution of retrieval, an add button 323 used to add a user selected from retrieval results, a cancel button 324 used to cancel work, and a display field 330 in which a retrieval result is displayed or an explanatory sentence is displayed.

A name, a mail address, and a provider type are displayed in a heading section of the display field 330. Above all, a checkbox 331 is provided in the name. The checkbox 331 is used to select all users displayed in the display field 330 as a result of retrieval.

In FIG. 8, three contents are described in the display field 330.

One is a description indicating that the current state is a state before retrieval is performed or a state in which a user corresponding to a character string is not found.

Another is a description for explaining work required for retrieval.

The other is a description for giving an instruction for operating the retrieval button 322 instead of inputting a character string in order to display all candidates of tenant users of which authority to use the sharing service is not registered.

FIG. 6 will be continuously described.

Herein, a description will be made of a case where the manager on the sharing service provider side clicks the retrieval button 322 (refer to FIG. 8) through the sharing service management terminal 43 in a state in which the input field 321 (refer to FIG. 8) is blank.

The reason why the retrieval button 322 is clicked in a state in which the input field 321 is blank is that the manager on the service provider side does not know all tenant users registered in the tenant selected as a work target.

Of course, in a case where a specific name or a mail address is input to the input field 321, the input specific name or mail address is a retrieval target.

In a case where clicking of the retrieval button 322 is received (step S3), the sharing service management terminal 43 requests the manager terminal 10 of the target tenant to retrieve tenant users of which authority to use the sharing service is not registered.

An identifier (user ID) of the manager of the tenant is used for communication including the request. The communication here reaches the corresponding manager terminal 10 through the firewall 20.

The manager terminal 10 having received the request retrieves tenant users (step S4).

The manager terminal 10 notifies the sharing service management terminal 43 of retrieval results via the firewall 20.

In the present exemplary embodiment, the sharing service management terminal 43 is notified of information regarding the user C and the user D of which authority to use the sharing service is not registered among four tenant users (the user A, the user B, the user C, and the user D) registered in the tenant.

However, a structure may be employed in which the manager terminal 10 notifies the sharing service management terminal 43 of information regarding all of the tenant users (the user A, the user B, the user C, and the user D) registered in the tenant, and the sharing service management terminal 43 side acquires the unregistered tenant users.

In a case where the retrieval results are received from the manager terminal 10 (that, the information regarding the corresponding persons is acquired), the sharing service management terminal 43 displays the corresponding persons as the retrieval results (step S5).

Figure 9:
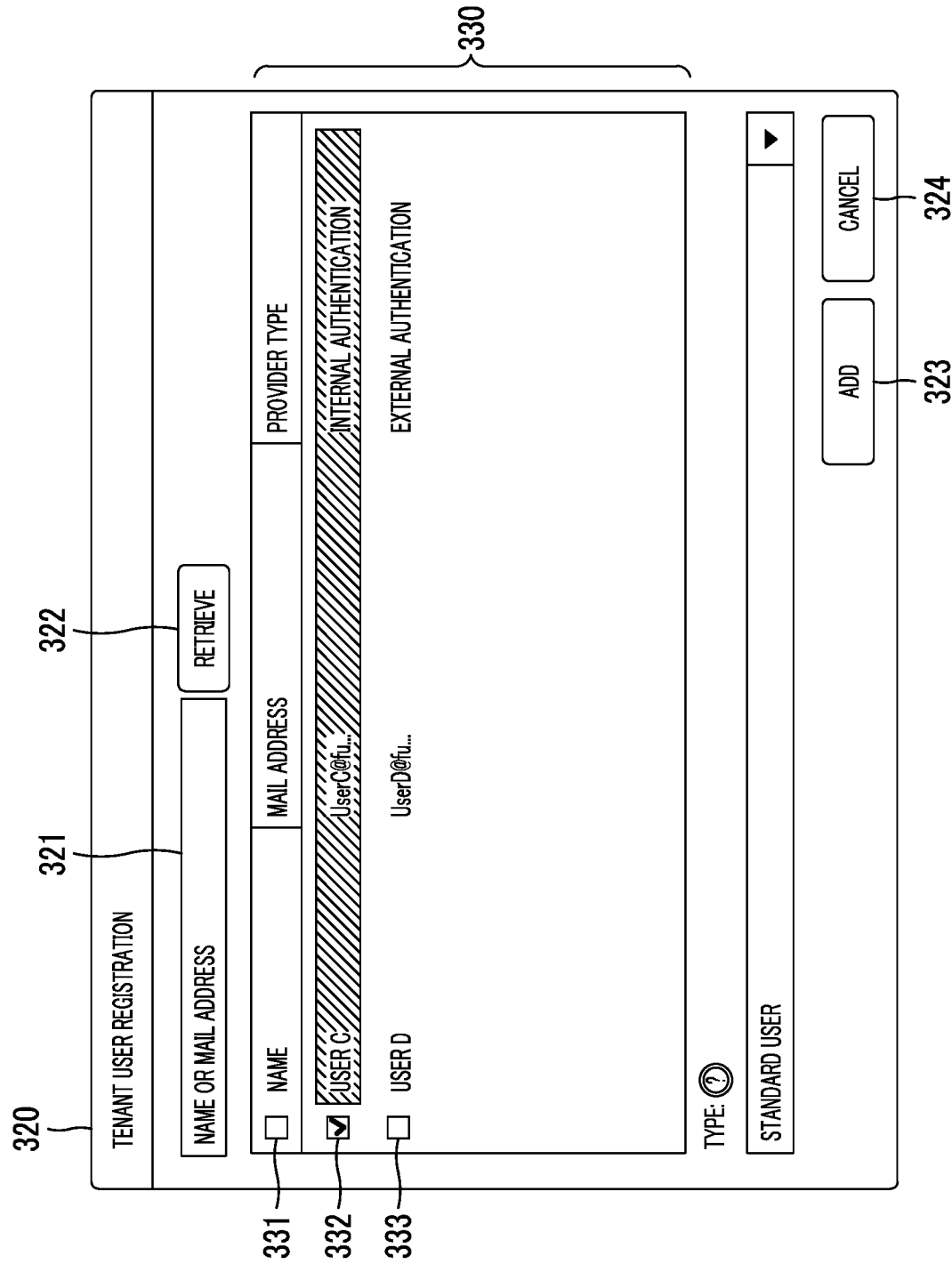
FIG. 9 is a diagram for explaining a display example of a retrieval result in the tenant user registration dialogue.

FIG. 9 is a diagram for explaining a display example of the retrieval results in the tenant user registration dialogue 320.

In FIG. 9, two persons such as the user C and the user D are displayed as tenant users of which authority to use the sharing service is not registered. In the example illustrated in FIG. 9, a name, a mail address, and a provider type are displayed as information regarding each tenant user. The provider type includes two types such as internal authentication and external authentication.

Display of the internal authentication indicates that a target tenant user belongs to the sharing service provider side. In this case, an identifier (employee number, a mail address, or the like) used for management inside an organization is used for authentication.

Display of the external authentication indicates that a target tenant user does not belong to the sharing service provider side. In this case, an identifier (employee number, a mail address, or the like) used for management in an external organization is used for authentication.

In the display field 330, a selection checkbox 332 is displayed at the beginning of each tenant user.

FIG. 9 illustrates a state in which a check is displayed in the checkbox 332 for the user C, and the user C is selected as an additional candidate. Therefore, in the example illustrated in FIG. 9, the user D is not selected as an additional candidate.

Figure 10:
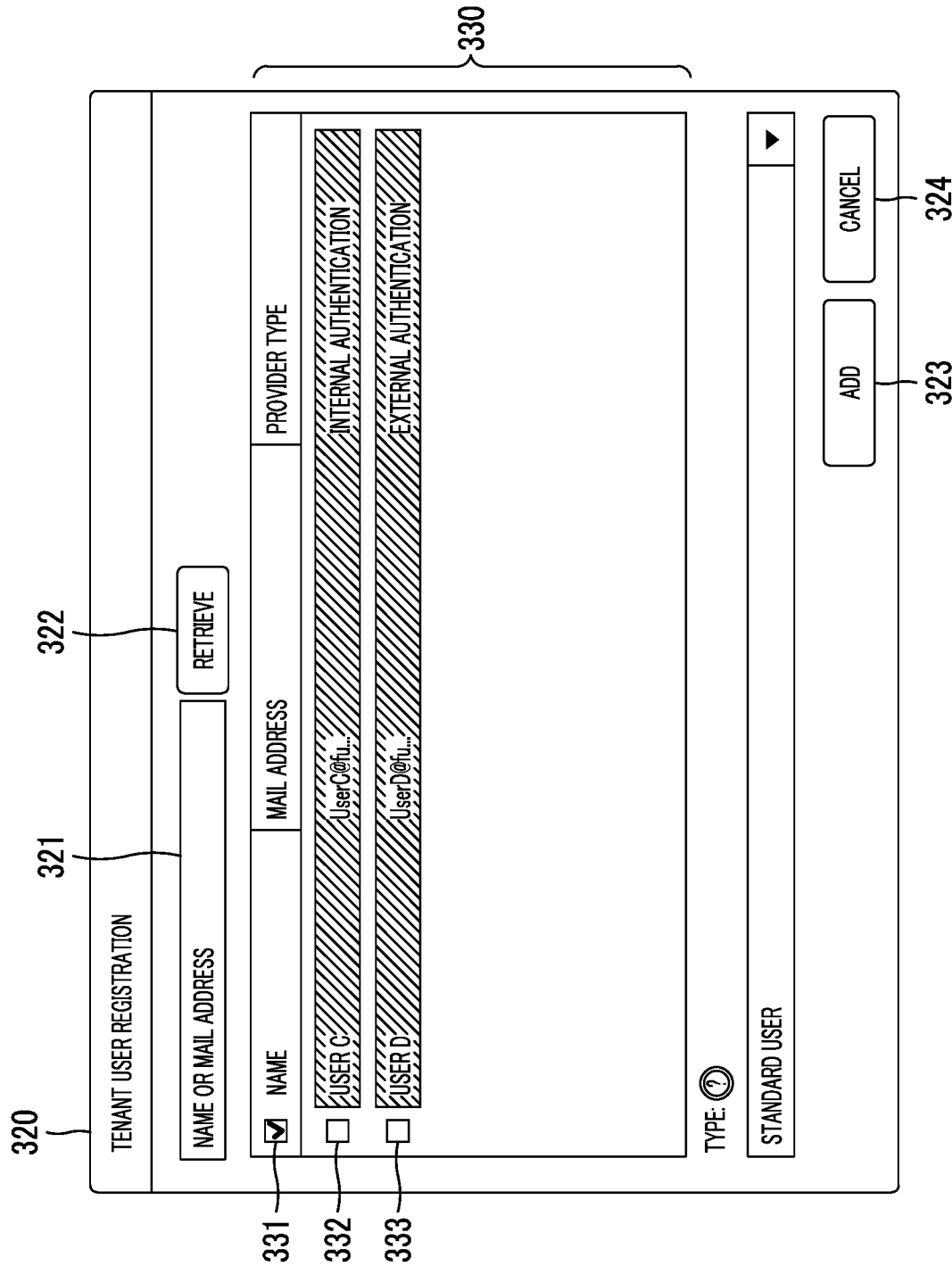
FIG. 10 is a diagram for explaining another display example of a retrieval result in the tenant user registration dialogue.

FIG. 10 is a diagram for explaining another display example of a retrieval result in the tenant user registration dialogue 320.

In FIG. 10, two persons such as the user C and the user D are also displayed as tenant users of which authority to use the sharing service is not registered.

In FIG. 10, a check is displayed in the checkbox 331 provided in the heading section of the display field 330. This state is a state in which all tenant users (that is, the user C and the user D) displayed in the display field 330 are selected as additional candidates.

FIG. 6 will be continuously described.

In a case where the add button 323 (refer to FIGS. 9 and 10) is clicked in a state in which either one of the checkboxes 331 and 332 (refer to FIGS. 9 and 10) is checked, the sharing service management terminal 43 receives selection of a tenant user to be registered, and notifies the manager terminal 10 of the corresponding tenant thereof (step S6).

In a case where the manager terminal 10 having received the notification assigns authority to use the sharing service to the users related to the notification, it is checked whether or not the number of licenses defined in a contract is exceeded (step S7). Checking regarding the number of licenses is an example of a predefined condition required to assign authority to use the sharing service to a tenant user.

In a case where the number of licenses on the contract is not exceeded, the manager terminal 10 assigns authority to use the sharing service to the users (the user C and the user D in the present exemplary embodiment) related to the notification, and notifies the sharing service management terminal 43 of completion of registration (step S8). The completion of registration here indicates that assignment of authority to use the sharing service is successful.

The sharing service management terminal 43 notified of the completion of registration additionally registers target persons (the user C and the user D in the present exemplary embodiment) as users of the sharing service (step S9).

Figure 11:
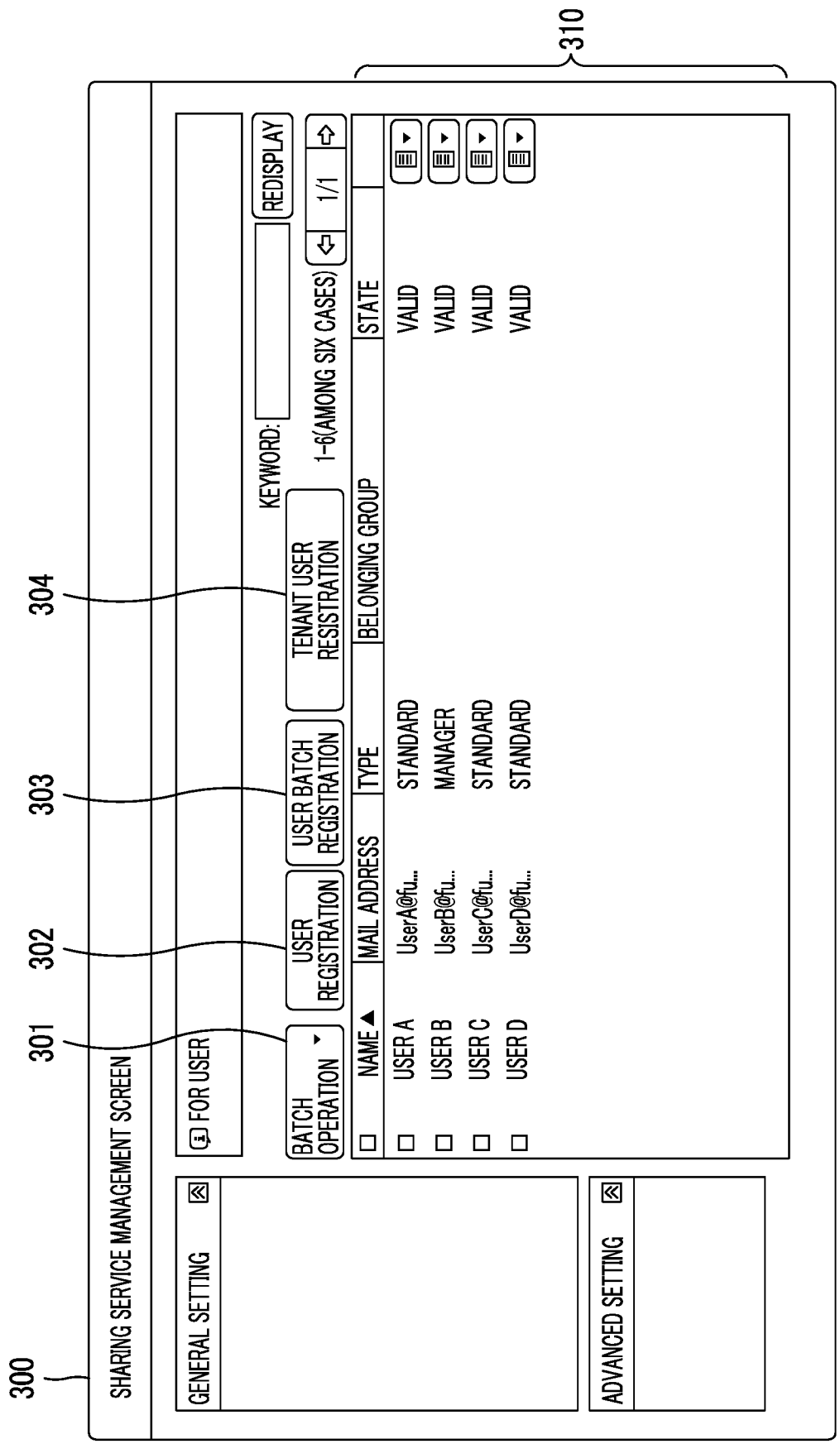
FIG. 11 is a diagram illustrating an example of the sharing service management screen displayed on the sharing service management terminal after registration is completed.

FIG. 11 is a diagram illustrating an example of the sharing service management screen 300 displayed on the sharing service management terminal after registration is completed.

In FIG. 11, portions corresponding to those in FIG. 7 are given corresponding reference numerals.

Four users (the user A, the user B, the user C, and the user D) are displayed in the operation screen 310 in FIG. 11 unlike the operation screen 310 (refer to FIG. 7) before registration work is started.

This indicates that the manager on the sharing service provider side is able to assign authority to use the sharing service without an operation of the manager on the tenant side. By employing such a structure, work of assigning authority to use the sharing service may be handed over to the sharing service provider side.

Process of Sharing Service Provider Side Editing Usage Authority

Hereinafter, a description will be made of other work which is able to be performed by the manager on the sharing service provider side.

Figure 12:
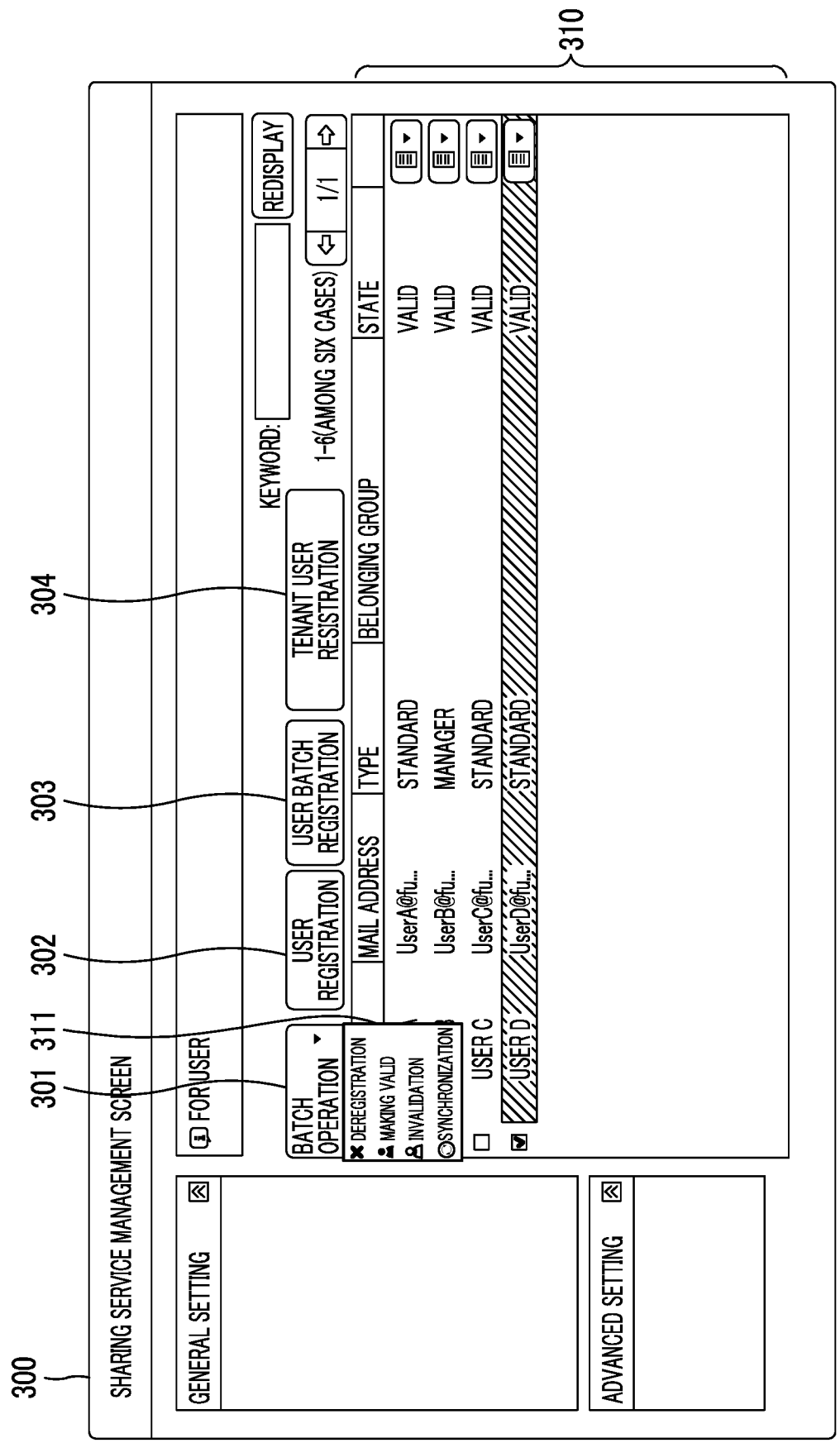
FIG. 12 is a diagram illustrating a display example of the sharing service management screen after a batch operation button is operated.

FIG. 12 is a diagram illustrating a display example of the sharing service management screen 300 after the batch operation button 301 is operated.

In a case where the batch operation button 301 is operated, a work box 311 is displayed. In the present exemplary embodiment, the work box 311 is displayed in a pull-down form, and may be displayed in a pop-up form.

The work box 311 includes operations of four types such as deregistration, making valid, invalidation, and synchronization. FIG. 12 illustrates a state in which the batch operation button 301 is operated in a state in which the user D is designated.

Figure 13:
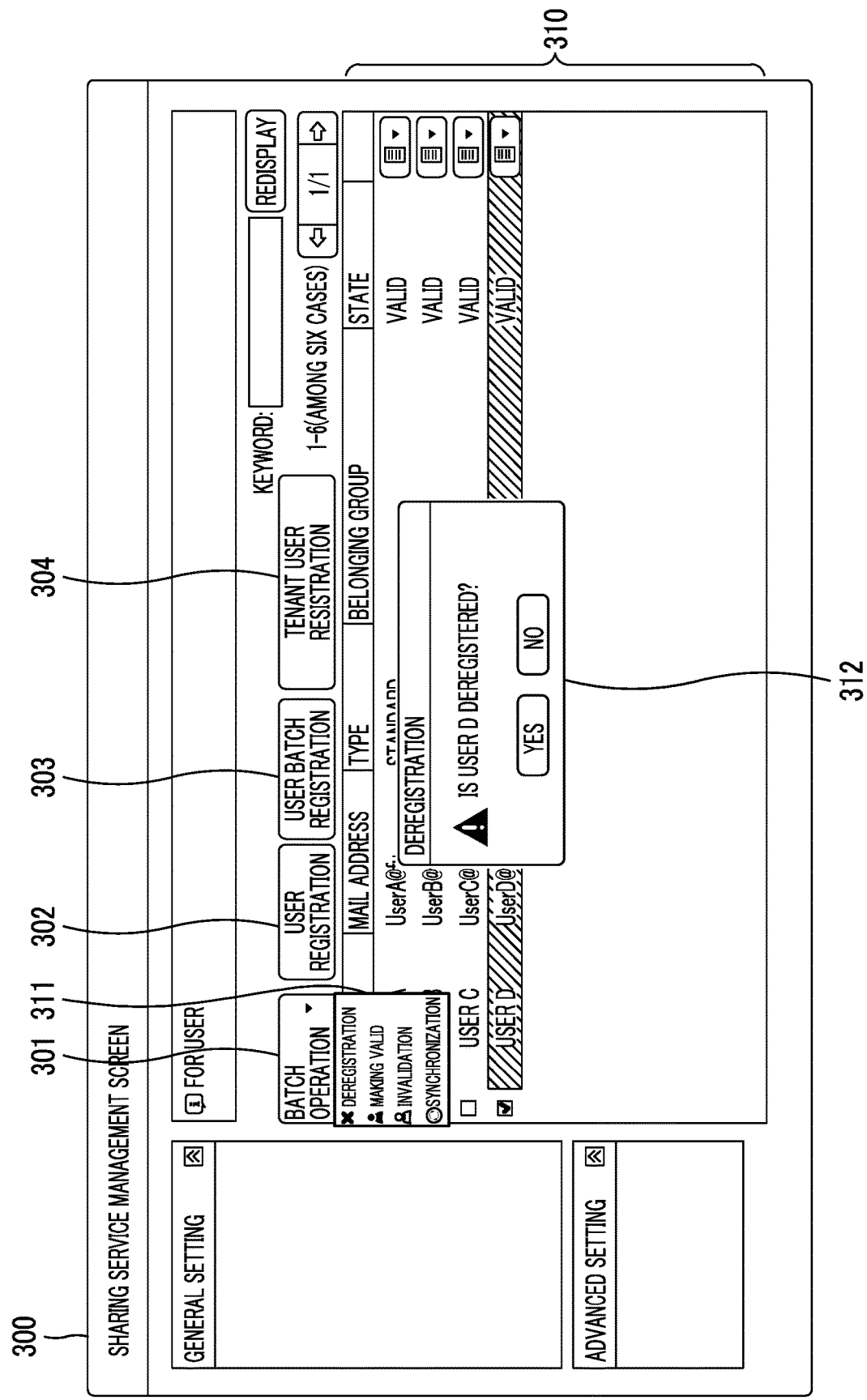
FIG. 13 is a diagram illustrating a display example of a deregistration dialogue displayed in a case where deregistration is selected in a work box.

FIG. 13 is a diagram illustrating a display example of a deregistration dialogue 312 displayed in a case where the deregistration is selected in the work box 311.

The deregistration dialogue 312 includes a sentence for checking a deregistration target person, a deregistration execution button, and a deregistration cancellation button.

In the example illustrated in FIG. 13, a target person is supposed to be the user D, but, in a case where a plurality of users are selected, a sentence for asking whether deregistration of a plurality of persons is performed is displayed.

Figure 14:
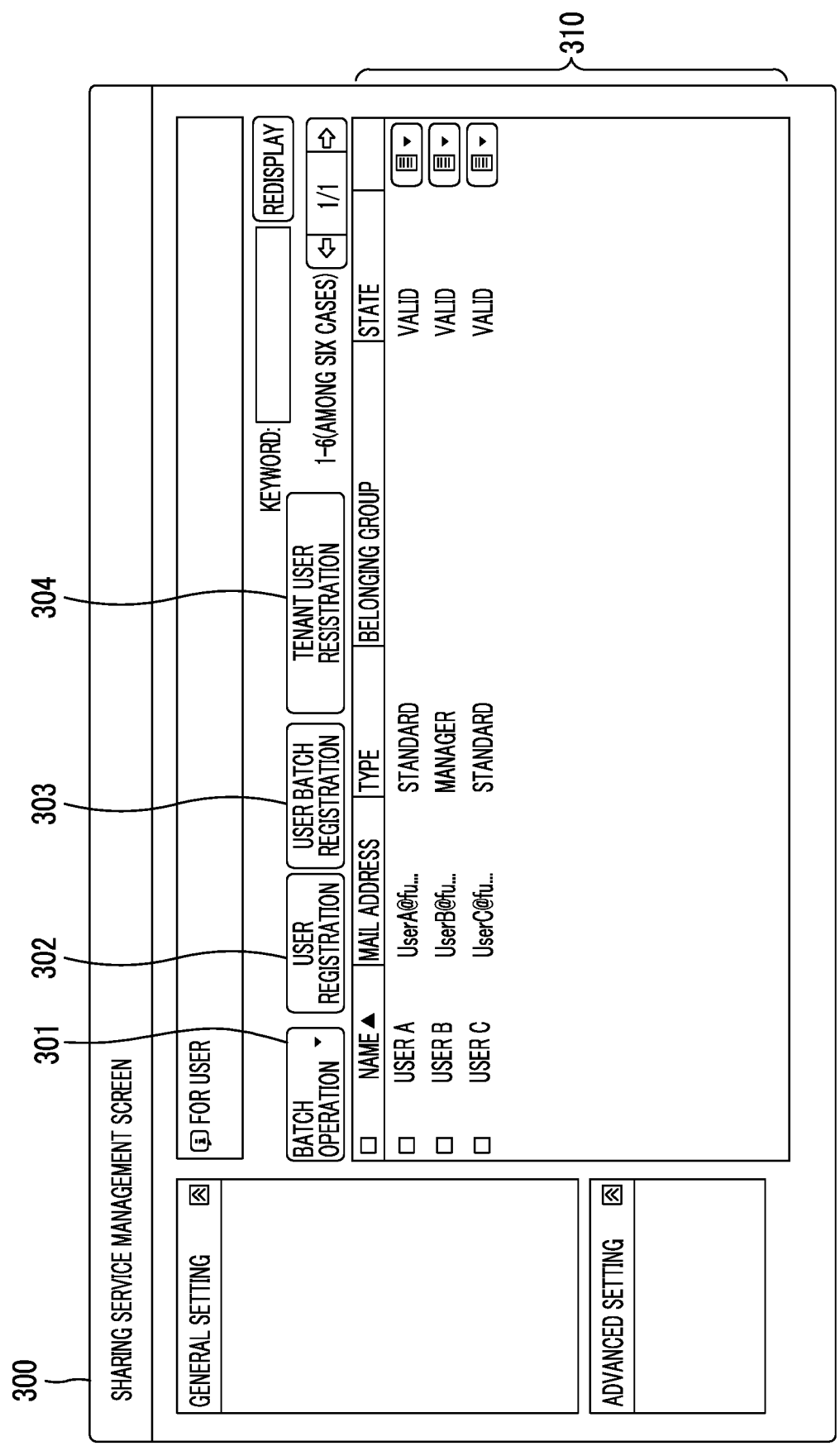
FIG. 14 is a diagram illustrating a display example of the sharing service management screen after deregistration is performed.

FIG. 14 is a diagram illustrating a display example of the sharing service management screen 300 after deregistration is performed.

In FIG. 14, portions corresponding to those in FIG. 12 are given corresponding reference numerals.

Four persons such as the user A, the user B, the user C, and the user D are displayed as users on the sharing service management screen 300 (FIG. 12) before work is started, but three persons such as the user A, the user B, and the user C are displayed as users on the sharing service management screen 300 illustrated in FIG. 14. This is because the user D is deregistered.

As mentioned above, in a case where registration of a specific user receiving provision of the sharing service is canceled through work performed by the manager on the sharing service provider side, corresponding registered data on the tenant side is also updated.

The registered data on the tenant side is updated in interlocking with, for example, an operation on the deregistration dialogue 312 (refer to FIG. 13).

However, the registered data on the tenant side is updated in interlocking with an operation on the synchronization button in the work box 311 (refer to FIG. 12).

Example of Management Screen on Tenant Side

For reference, a description will be made of a management screen used by the manager on the tenant side.

Figure 15:
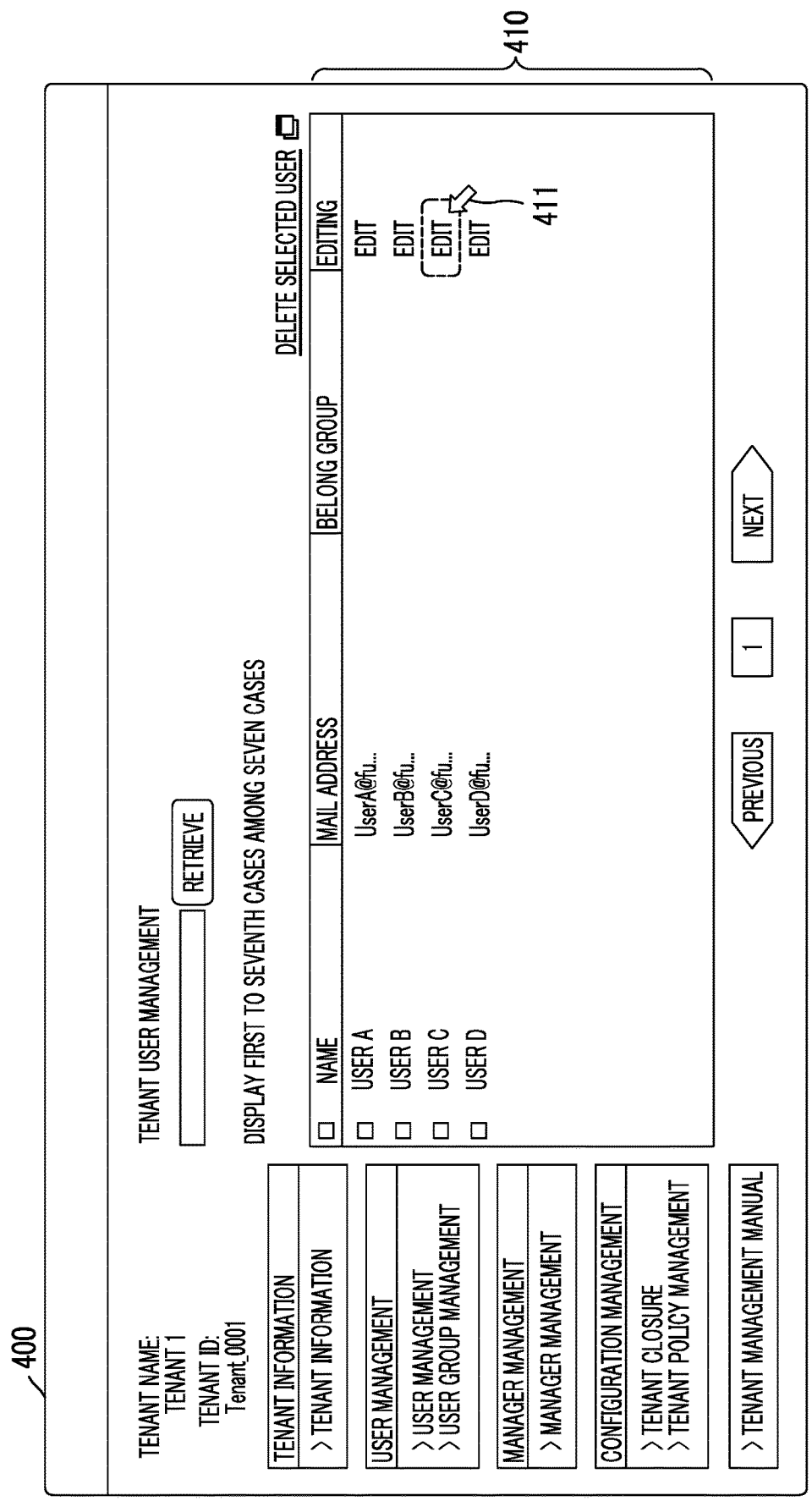
FIG. 15 is a diagram for explaining an example of a tenant user management screen displayed on a manager terminal in a tenant.

FIG. 15 is a diagram illustrating an example of a tenant user management screen 400 displayed on the manager terminal 10 on the tenant side.

In FIG. 15, four persons such as the user A, the user B, the user C, and the user D are displayed as tenant users in the display field 410.

Herein, a description will be made of a case where an editing button for the user C is clicked with a mouse cursor 411.

FIG. 16 is a diagram illustrating an example of a tenant user editing screen 420 displayed in a case where authority to use the electronic document sharing service is assigned.

The name, a mail address, a belonging group, and a usage service of a user who is an editing target are displayed on the tenant user editing screen 420. In the example illustrated in FIG. 16, usage authority is assigned to the user C, and thus a sharing service 421 is written in the usage service field.

FIG. 17 is a diagram illustrating an example of the tenant user editing screen 420 displayed in a case where authority to use the electronic document sharing service is not assigned.

In FIG. 17, usage authority is not assigned to the user C, and the usage service field is blank.

The manager on the tenant side may edit information regarding a specific tenant user selected as a work target or may check the current registered content on the tenant user editing screen 420.

Other Exemplary Embodiments

As mentioned above, the exemplary embodiments of the invention have been described, but the technical scope of the invention is not limited to the scope disclosed in the exemplary embodiments. It is clear from the disclosure of claims that exemplary embodiments obtained by adding various modifications or alterations to the exemplary embodiments are also included in the technical scope of the invention.

In the exemplary embodiments, as an example of a first service, a description has been made of the tenant type service in which provision of a service is managed by using an identifier allocated to the service, but the first service is not limited to the tenant type service.

In the exemplary embodiments, as an example of a second service, a description has been made of a service of sharing an electronic document on a cloud, but the second service is not limited to a service provided on the cloud or a sharing service on the cloud. The second service may be other services of managing usage authority in the individual unit.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
a first hardware processor configured to:
be provided on a user side receiving provision of a first service which is a tenant type service, and
manage assignment of authority to use a second service to a first user registered for the first service in an individual unit; and
a second hardware processor configured to:
be provided on a provider side providing the second service which is a service which enables an electronized document on a cloud to be shared, and
manage a second user having authority to use the second service,
wherein the second hardware processor is configured to acquire information regarding the first user not assigned with the authority to use the second service, from the first hardware processor via a firewall provided between the first hardware processor and the second hardware processor,
wherein the second user is a common user between the user side and the provider side.

2. The information processing system according to claim 1,
wherein the second hardware processor is configured to receive a request for registration of the first user not assigned with the authority to use the second service.

3. The information processing system according to claim 2,
wherein the second hardware processor is configured to individually receive whether or not the first user acquired from the first hardware processor is registered as the second user in response to the request.

4. The information processing system according to claim 2,
wherein the second hardware processor is configured to receive whether or not a plurality of the first users acquired from the first hardware processor are collectively registered as a plurality of the second users through a single designation in response to the request.

5. The information processing system according to claim 1,
wherein, in a case where the first user to be additionally registered as the second user is specified, the second hardware processor is configured to request the first hardware processor to assign the authority to use the second service to the specified first user.

6. The information processing system according to claim 5,
wherein, in a case where assignment of the authority to use the second service to the specified first user is successful in the first hardware processor, the second hardware processor is configured to assign the authority to use the second service to the specified first user.

7. The information processing system according to claim 1,
wherein, in a case where there is a request from the second hardware processor, the first hardware processor is configured to send a notification of information regarding assignment of the authority to use the second service.

8. The information processing system according to claim 7,
wherein the information regarding assignment of the authority to use the second service is information for specifying the first user not assigned with the authority to use the second service.

9. The information processing system according to claim 1,
wherein, in a case where a predefined condition is satisfied, the first hardware processor is configured to assign the authority to use the second service to the first user specified by the second hardware processor.

10. The information processing system according to claim 9, wherein the predefined condition is to satisfy the number of licenses for the second service.

11. The information processing system according to claim 1,
wherein provision of the first service is managed by using an identifier allocated to the first service, and provision of the second service is managed in the individual unit by using the presence or absence of usage authority.

12. A non-transitory computer readable medium storing a program causing a computer, provided on a provider side providing a second service which is a service which enables an electronized document on a cloud to be shared, to function as:
  an acquisition unit that acquires information regarding a first user not assigned with authority to use the second service among first users registered for a first service which is a tenant type service through communication with a terminal provided on a user side receiving provision of the first service via a firewall provided between the information processing apparatus and the terminal; and
  a management unit that manages a second user having the authority to use the second service,
  wherein the second user is a common user between the user side and the provider side.

* * * * *